United States Patent [19]

Yamada

[11] Patent Number: 5,743,169
[45] Date of Patent: Apr. 28, 1998

[54] DIAPHRAGM ASSEMBLY AND METHOD OF MANUFACTURING SAME

[75] Inventor: Kazumasa Yamada, Ohta-ku, Japan

[73] Assignee: Yamada T.S. Co., Ltd., Tokyo, Japan

[21] Appl. No.: 520,828

[22] Filed: Aug. 29, 1995

[30] Foreign Application Priority Data

Jan. 6, 1995 [JP] Japan ................... 7-000783

[51] Int. Cl.⁶ ........................................ F01B 19/00
[52] U.S. Cl. ........................ 92/100; 92/99; 92/103 F; 92/103 SD
[58] Field of Search ................. 92/99, 100, 98 R, 92/103 R, 103 SD

[56] References Cited

U.S. PATENT DOCUMENTS

| | | | |
|---|---|---|---|
| 3,377,922 | 4/1968 | Spender et al. | 92/100 |
| 3,385,174 | 5/1968 | Crosland | 92/99 |
| 4,198,028 | 4/1980 | Cook | 92/100 |
| 4,227,445 | 10/1980 | Detweiler | 92/100 |
| 4,720,079 | 1/1988 | Iizuka et al. | |

FOREIGN PATENT DOCUMENTS

| | | |
|---|---|---|
| 1802780 | 9/1970 | Germany. |
| 3318754 | 12/1984 | Germany. |
| 901184 | 7/1962 | United Kingdom. |
| 2144517 | 3/1985 | United Kingdom. |

OTHER PUBLICATIONS

Patent Abstracts of Japan vol. 011, No. 348 (M–642), 14 Nov. 1987 & JP-A-62 127571 (Toyoda Gosei Co Ltd), 9 Jun. 1987. *abstract*.

Primary Examiner—Thomas E. Denion
Attorney, Agent, or Firm—Biebel & French

[57] ABSTRACT

A diaphragm assembly has a center disk in which use of a metal member is not required. The center disk comprises first and second center disk members, made of resin, embracing a resin diaphragm between them. The first center disk member has an inwardly directed inner flange on an inner peripheral wall defining a resin charging space, and the second center disk member comprises a resin-molded body, formed by charging a resin, and has an outwardly directed outer flange. A portion of the diaphragm is clamped between the inner flange and the outer flange.

3 Claims, 9 Drawing Sheets

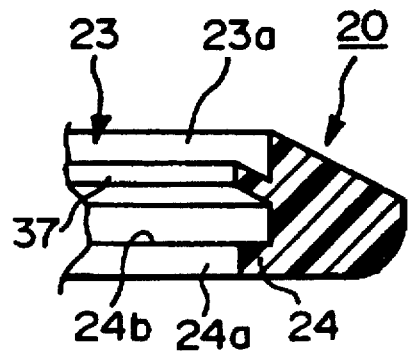
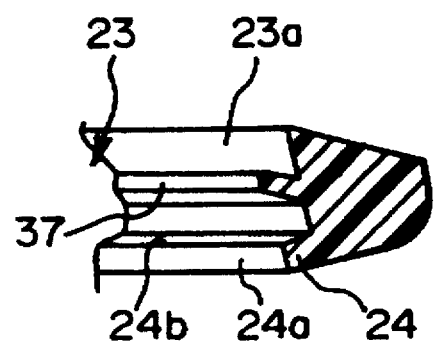
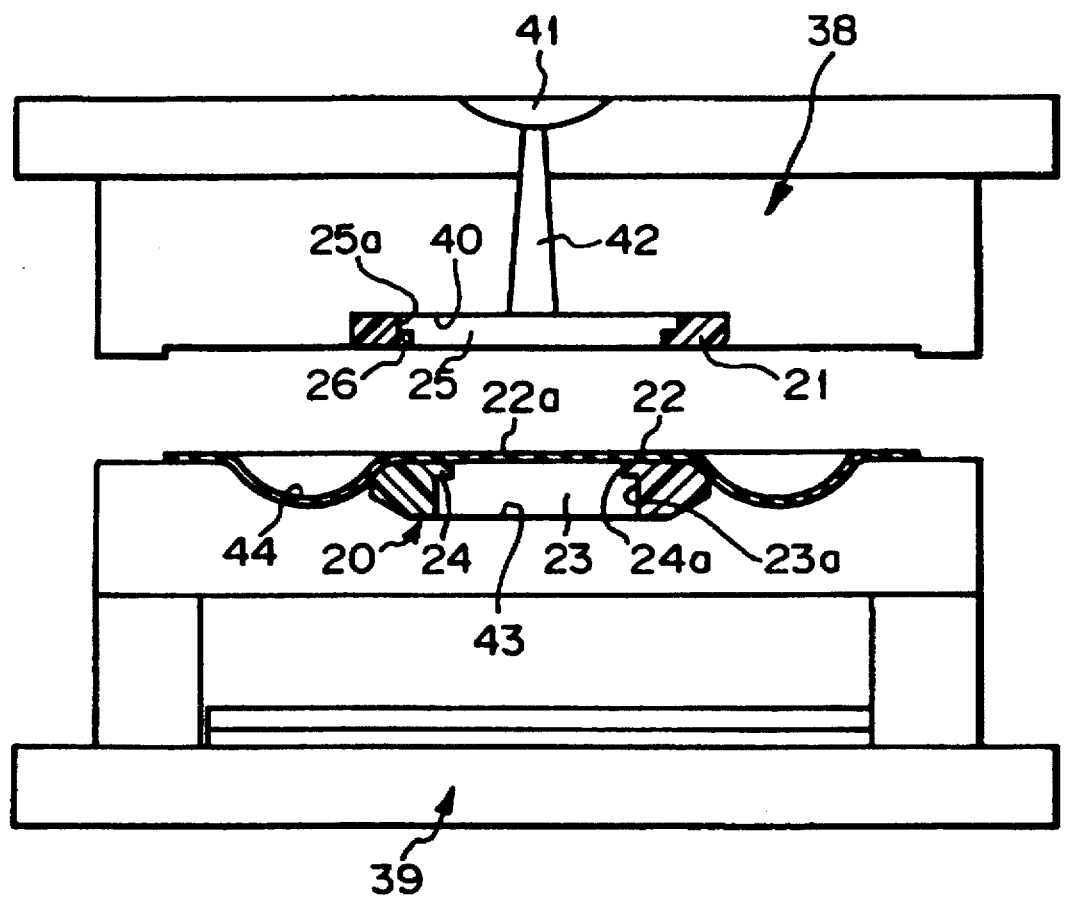

5,743,169

1

DIAPHRAGM ASSEMBLY AND METHOD OF MANUFACTURING SAME

BACKGROUND OF THE INVENTION

1. Field of the Invention

This invention relates to a diaphragm assembly, and to a method of manufacturing the same, in which a center disk or the like to which a support rod has been fastened does not require any members made of metal. The diaphragm assembly according to the present invention is ideal for use in flow control valves or pump devices which deal with etching solutions in semiconductor manufacturing processes.

2. Description of the Related Art

A conventional diaphragm assembly having the structure shown in FIGS. 14 and 15 is used in flow control valves or pump devices which deal with etching solutions in semiconductor manufacturing processes.

FIG. 14 is a plan showing, in part, a diaphragm 2 and center disk 3 which construct a diaphragm assembly 1 according to the prior art. FIG. 15 is a longitudinal sectional view illustrating the diaphragm assembly 1 of FIG. 14. The center disk 3 comprises a center disk member 4 disposed on a liquid-contact side for coming into contact with an etching solution, and a center disk member 5, which is disposed on a liquid non-contact side, situated on the side opposite the center disk member 4 with respect to the diaphragm 2 interposed between them. The center disk member 4 on the liquid-contact side comprises a synthetic resin body 6 consisting of a fluoroplastic and a metal member 7 for the purpose of reinforcing the resin body 6. The metal member 7 of the center disk member 4 is coated with a fluoroplastic. The diaphragm 2, which is made of a fluoroplastic or the like, the center disk member 5 on the liquid non-contact side and the metal member 7 are each formed to have a through-hole through which a support rod 8 is passed. The inner peripheral wall of the through-hole in the metal member 7 is formed to have a threaded portion 9 for threadedly engaging the support rod 8. By threadedly engaging a threaded portion 10 on the support shaft 8 with the threaded portion 9 on the metal member 7, the diaphragm 2 is clamped between the center disk member 4 on the side of liquid contact and the center disk member 5 on the liquid non-contact side. An O-ring 11 serving as a sealing portion is provided on the inner peripheral wall of the through-hole in the center disk member 5 on the liquid non-contact side. The O-ring 11 is provided in such a manner that the liquid which contacts the center disk member 4 on the side of liquid contact will not flow out to the liquid non-contact side by passing through the through-hole.

FIGS. 16 and 17 illustrate another example of a diaphragm assembly according to the prior art. FIG. 16 is a plan view showing, in part, the structure of the diaphragm assembly 1 in which the diaphragm 2 and center disk 3 have a unitary construction. FIG. 17 is a longitudinal sectional view illustrating the diaphragm assembly 1 of FIG. 16. The diaphragm assembly 1 is obtained by mechanically cutting a synthetic resin block to integrally form a center disk portion 3' along with a film portion 2', using a metal member 14 whose inner periphery has a threaded portion 12 for fastening the support rod 8 and whose outer periphery has a threaded portion 13 for being fitted into a threaded hole formed portion 13 for being fitted into a threaded hole formed in the center disk 3', and threadedly engaging the metal member 14 with the center disk portion 3'.

When leakage of liquid or the like occurs due to breakage or fatigue of the diaphragm assembly in a flow control valve

2 or pump device for an etching solution in a semiconductor manufacturing process in which the diaphragm assembly is used, the metal member is dissolved by the etching solution which, as a result, becomes contaminated with metal ions. If a semiconductor is manufactured using an etching solution in which the concentration of such metal ions in solution exceeds 40 ppb, the result is an unstable switching characteristic, which can be fatal to a semiconductor. Since this means that the manufacturing line must be stopped and a cleaning operation carried out, considerable economic loss results, especially today when the degree of integration of semiconductors is very high.

Since the conventional diaphragm assembly uses the metal member as a structural element, the aforementioned contamination is essentially unavoidable. Further, the structure of the conventional diaphragm assembly shown in FIGS. 14 and 15 is disadvantageous in that the diaphragm requires the through-hole to support the rod, and the diaphragm is clamped between the center disk member on the side of liquid contact and the center disk member on the liquid non-contact side by tightening via the support rod. As a result, the diaphragm holding force declines under severe running conditions, and the diaphragm develops leakage of liquid through the through-hole for the support rod. Such leakage is difficult to prevent. Furthermore, the service life of the diaphragm assembly is shortened by corrosion of the metal member. On the other hand, a drawback with the diaphragm assembly shown in FIGS. 16 and 17 is that the synthetic resin of the center disk portion can develop cracks from which the etching solution reaches the metal member, thereby causing metal ions to flow out to the liquid-contact side and contaminate the etching solution. In addition, the metal member corrodes and shortens the lifetime of the diaphragm assembly. Moreover, the diaphragm assembly is difficult and costly to manufacture.

SUMMARY OF THE INVENTION

Accordingly, a first object of the present invention is to provide a diaphragm assembly in which no metal members whatsoever are used for the support rod, diaphragm and center disk, and in which the diaphragm does not have a through-hole for the support rod.

A second object of the present invention is to provide a method of manufacturing the diaphragm assembly.

According to the present invention, the first object is attained by providing a diaphragm assembly having a center disk comprising first and second center disk members, made of resin, embracing a diaphragm made of resin, the first center disk member having an inwardly directed inner flange on an inner peripheral wall forming a resin charging space, the second center disk member comprising a resin-molded body, formed by charging a resin, and having an outwardly directed outer flange, a portion of the diaphragm being clamped by the inner flange and the outer flange. More specifically, a center disk to which a support rod is fastened comprises a pair of first and second center disk members, which are made of resin, the center disk members residing on respective sides of a diaphragm. The first center disk member has a centrally located resin charging space filled with resin and has an inner peripheral wall delimiting the resin charging space, the inner peripheral wall being formed to have an inwardly projecting inner flange. The second center disk member is composed of at least a resin-molded body molded by charging a resin. The resin-molded body has an outwardly projecting first outer flange residing inside the resin charging space and a second outer flange residing outside the resin charging space and cooperating with the first outer flange to embrace the inner flange from both sides in the thickness direction thereof. The diaphragm is disposed along and in intimate contact with the inner peripheral wall delimiting the resin charging space, and a portion of the diaphragm is clamped between the inner flange and the first and second outer flanges.

The second center disk member in the diaphragm assembly according to the present invention has a reinforcing center disk member made of resin. More specifically, the second center disk member has a reinforcing center disk member, which is made of resin, opposing the first center disk member via the intermediary of the diaphragm. The reinforcing center disk member has a centrally location resin charging space filled with resin.

The diaphragm assembly according to the present invention is further characterized in that the inner peripheral wall of the first center disk member is formed to have serrated surface. More specifically, the inner peripheral wall delimiting the resin charging space of the first center disk member is formed, along the circumferential direction thereof, with serrations for dispersing stress, which develops in the direction of rotation, applied to the second center disk member and diaphragm.

The diaphragm assembly according to the present invention is further characterized in that the inner flange of the first center disk member has an inclined surface for preventing dislodgment of the resin-molded body. More specifically, of the two outer flanges mentioned above, the first outer flange residing inside the resin charging space of the first center disk member comprises a flange having a small diameter, and the second outer flange residing outside the resin charging space of the first center disk member comprises a flange having a larger diameter. The first center disk member is such that one end face of the inner flange in the thickness direction thereof, which end face is on the side near the small-diameter flange, is formed as an inclined surface. When the inner flange is deformed in such a direction that the resin-molded body may become dislodged, the inclined surface applies an opposing force to prevent this from occurring. Furthermore, the first center disk member may be provided with an annular groove in the surface thereof opposite the inclined surface.

The diaphragm assembly according to the present invention is further characterized in that the inner peripheral wall of the first center disk member is formed to have a circumferentially extending inclined rib which prevents dislodgment. More specifically, in order to apply a resisting force in a direction for preventing dislodgment of the resin-molded body when the inner flange is deformed in such a direction that the resin-molded body may become dislodged, the inner peripheral wall delimiting the resin charging space of the first center disk member is formed to have a circumferentially extending inclined rib spaced away from the inner flange in the thickness direction thereof.

The diaphragm assembly according to the present invention is further characterized in that the resin-molded body is formed to have a threaded portion. More specifically, the second center disk member is formed to have a threaded portion for fastening a support rod.

The first center disk member of the diaphragm assembly according to the present invention is a center disk member on the side of liquid contact, and the second center disk member is a center disk member on the side of liquid non-contact.

According to the present invention, the second object is attained by providing a method of manufacturing a diaphragm assembly consisting solely of a resin material comprising the steps of setting a center disk member made of resin in a cavity of a mold, setting a thin, plate-shaped diaphragm made of resin in the cavity of the mold, charging a resin into the cavity and allowing the resin to harden so as to clamp the diaphragm, from both sides in the thickness direction thereof, by the center disk member.

In a specific example of such manufacture, a first center disk member made of resin is set in the cavity of the mold beforehand. The first center disk member has a centrally located resin charging space to be filled under high pressure with injected resin serving as the structural material of a center disk to which a support rod is to be fastened, and an inner peripheral wall delimiting the resin charging space, the inner peripheral wall being formed to have an inwardly projecting inner flange. A thin, plate-shaped diaphragm made of resin also is set in the mold cavity in advance and then an injected resin is charged into the resin charging space under high pressure through a resin charging port provided in the mold, thereby bringing the diaphragm into intimate contact with the inner peripheral wall of the first center disk member, which defines the resin charging space, while deforming the central portion of the diaphragm. The injected resin is allowed to harden to form a resin-molded body serving as a second center disk member which has an outwardly projecting first outer flange residing inside the resin charging space and a second outer flange residing outside the resin charging space and cooperating with the first outer flange to embrace the inner flange from both sides in the thickness direction thereof. Thus is formed a diaphragm assembly consisting solely of a resin material in which the diaphragm is clamped, from both sides in the thickness direction thereof, between the first and second outer flanges and the inner flange.

In a preferred embodiment, a method of manufacturing a diaphragm assembly consisting solely of a resin material comprises the steps of setting a center disk member made of resin and a previously molded plate-shaped diaphragm made of resin in a cavity of a mold, charging a resin into a resin charging space, and allowing the resin to cure to integrate the previously molded diaphragm and the center disk member.

In another preferred embodiment, a method of manufacturing a diaphragm assembly consisting solely of a resin material comprises the steps of setting a center disk member made of resin and a plate-shaped diaphragm made of resin in a cavity of a mold, deforming a portion of the diaphragm into a prescribed shape by blow molding, subsequently charging resin into a resin charging space, and allowing the resin to cure to integrate the previously molded diaphragm and the center disk member.

The manufacturing method of the present invention is further characterized by steps of setting a reinforcing center disk member made of resin in the cavity of the mold so as to embrace the diaphragm, and integrating the center disk member and the diaphragm by the injected resin to manufacture a diaphragm assembly consisting solely of a resin material. More specifically, the manufacturing method of the invention comprises the steps of setting a reinforcing center disk member, which is made of resin and has a centrally located resin charging space to be filled under high pressure with injected resin, in the cavity of the mold on the side thereof opposite the first center disk member so as to embrace the diaphragm therebetween, and charging the injected resin into the resin charging space to thereby integrate the first center disk member and the diaphragm with the resin-molded body serving as the second center disk member, thereby manufacturing a diaphragm assembly consisting solely of a resin material.

In accordance with the diaphragm assembly according to the present invention, all of the structural portions constructing the center disk to which the resin support rod is fastened consist solely of resin material. As a result, the diaphragm assembly of the invention is ideal for fabricating fluid pump devices and flow control valves in which contamination by metal ions is avoided, as well as pump devices and flow control valves that require chemical resistance. The diaphragm need not be provided with a through-hole for a support rod. The through-hole is the cause of leakage in the prior art.

In accordance with the present invention, injected resin is charged under high pressure into a resin charging space of a first center disk member. The first center disk member has the centrally located resin charging space to be filled under high pressure with the injected resin serving as the structural material of a center disk to which a support rod is to be fastened, and an inner peripheral wall delimiting the resin charging space, the inner peripheral wall being formed to have an inwardly projecting inner flange. By charging the resin, the diaphragm is forced into intimate contact with the inner peripheral wall, which defines the resin charging space, while the central portion of the diaphragm is deformed. The injected resin is allowed to harden to form a resin-molded body serving as a second resin center disk member which has an outwardly projecting first outer flange residing inside the resin charging space and a second outer flange residing outside the resin charging space and cooperating with the first outer flange to embrace the inner flange from both sides in the thickness direction thereof. As a result, a strong, integrated diaphragm assembly consisting solely of a resin material can be manufactured without a laborious assembly process.

Other features and advantages of the present invention will be apparent from the following description taken in conjunction with the accompanying drawings, in which like reference characters designate the same or similar parts throughout the figures thereof.

BRIEF DESCRIPTION OF THE INVENTION

FIGS. 5A and 5B illustrate a first modification of the first center disk member shown in FIG. 1, in which FIG. 5A is a plan view and FIG. 5B is a longitudinal sectional view;

FIGS. 6A and 6B illustrate a second modification of the first center disk member shown in FIG. 1, in which FIG. 6A is a plan view and FIG. 6B is a longitudinal sectional view;

FIGS. 7A and 7B illustrate a third modification of the first center disk member shown in FIG. 1, in which FIG. 7A is a plan view and FIG. 7B is a longitudinal sectional view;

FIGS. 8A and 8B are basic diagrams for describing a more useful improvement in the first center disk member of FIG. 1, in which FIG. 8A is a plan view and FIG. 8B is a longitudinal sectional view;

Figure 8A:
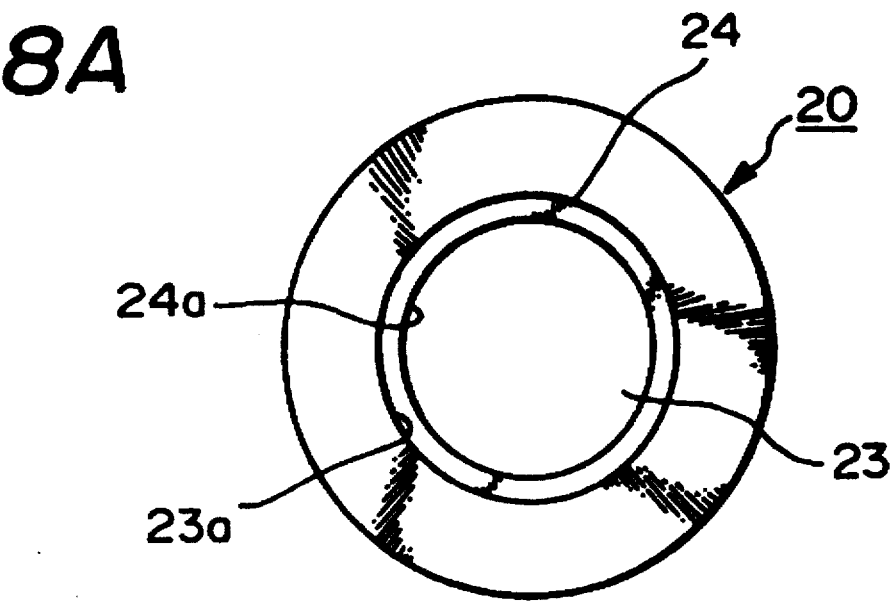
Figure 8B:
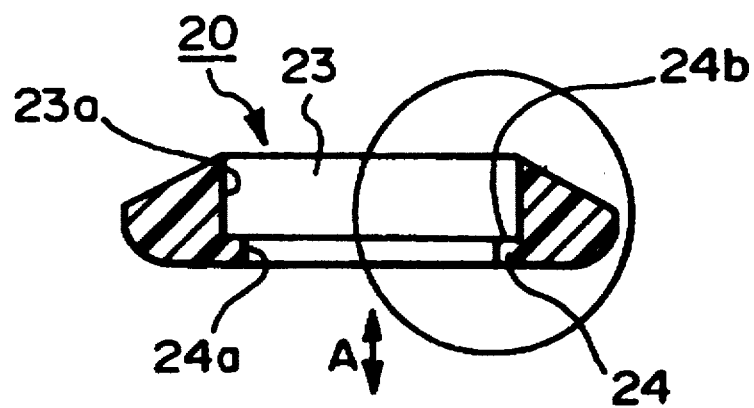
Figure 9A:
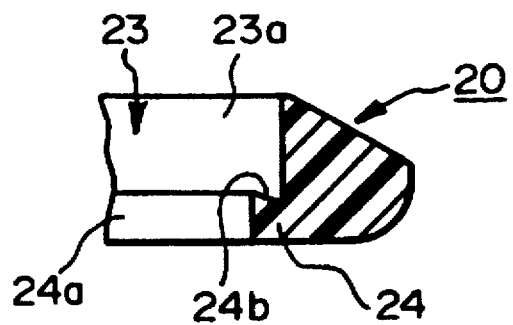
Figure 9B:
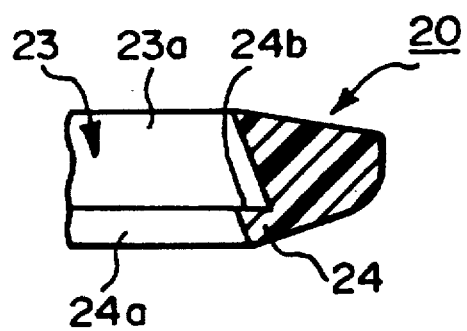
Figure 9C:
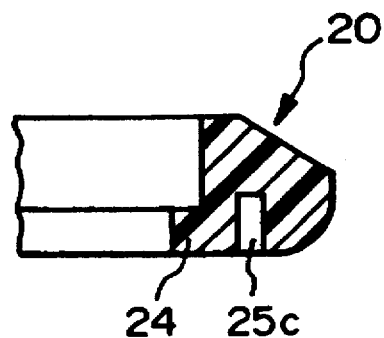
Figure 9D:
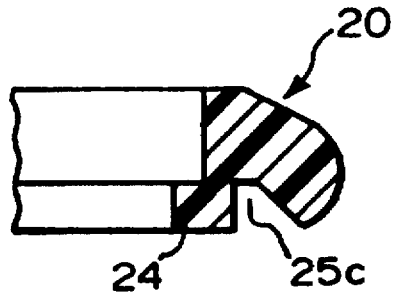
Figure 12A:
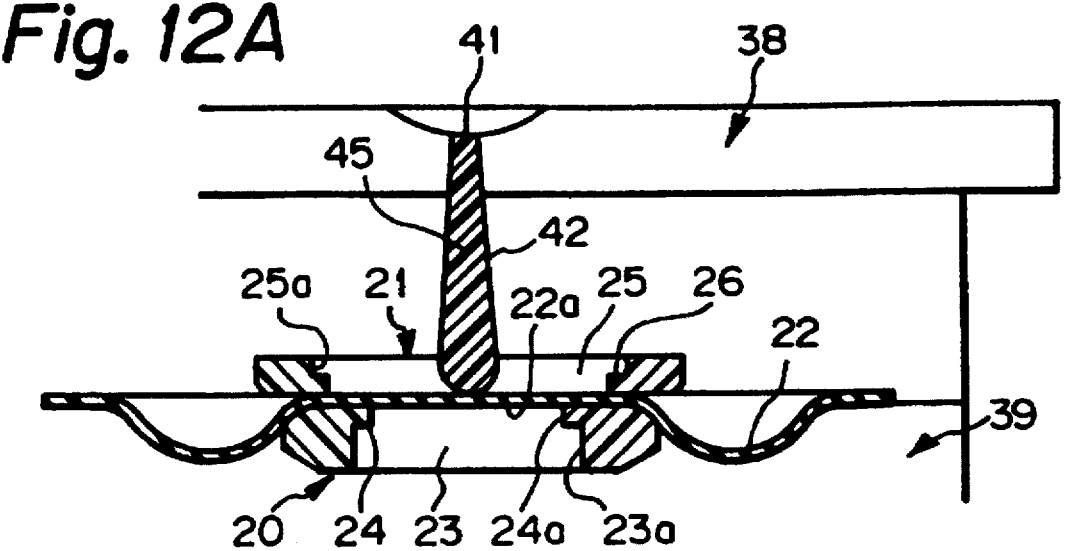
Figure 12B:
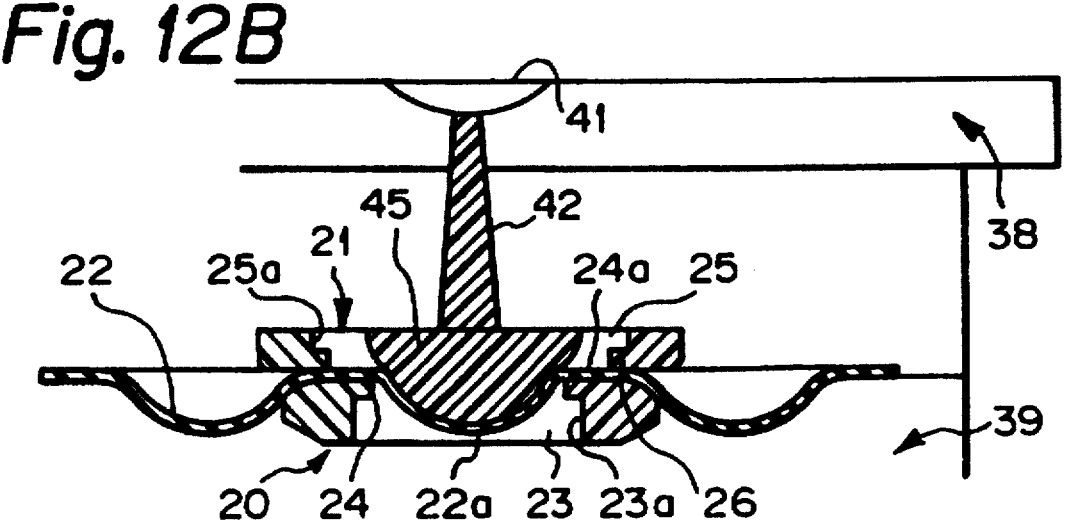
Figure 12C:
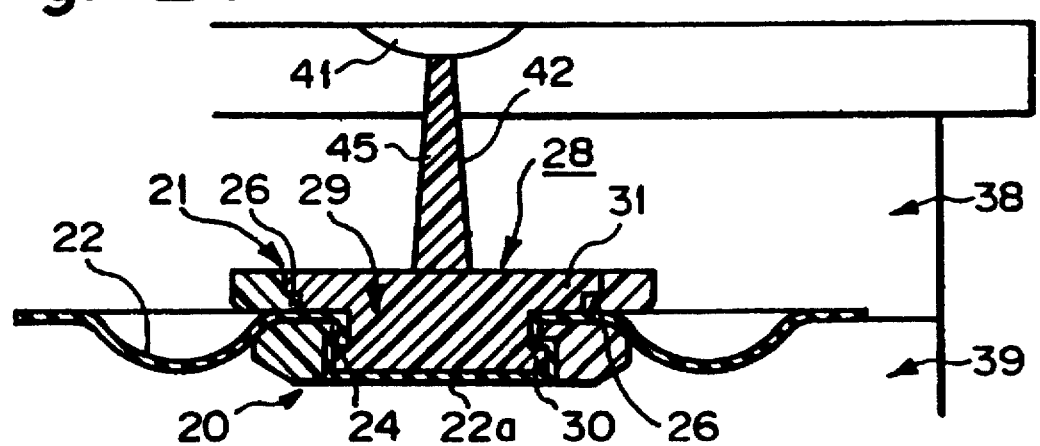
Figure 13:
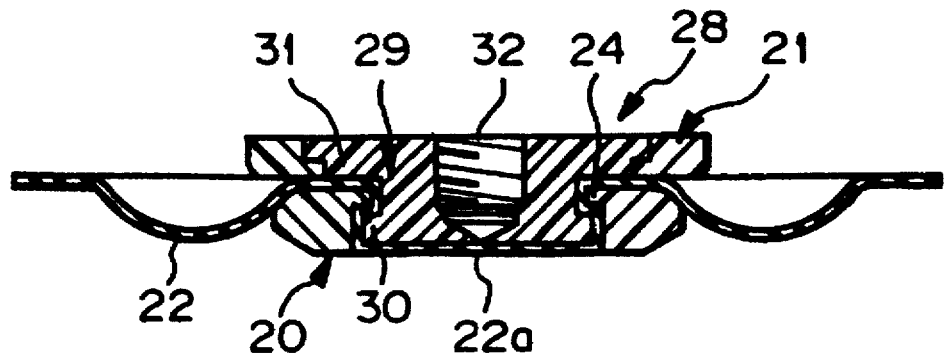
Figure 17:
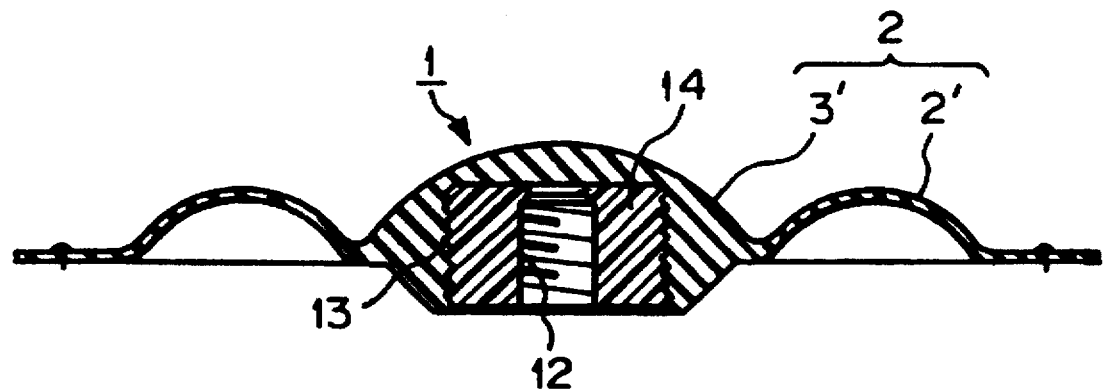
Figure 14:
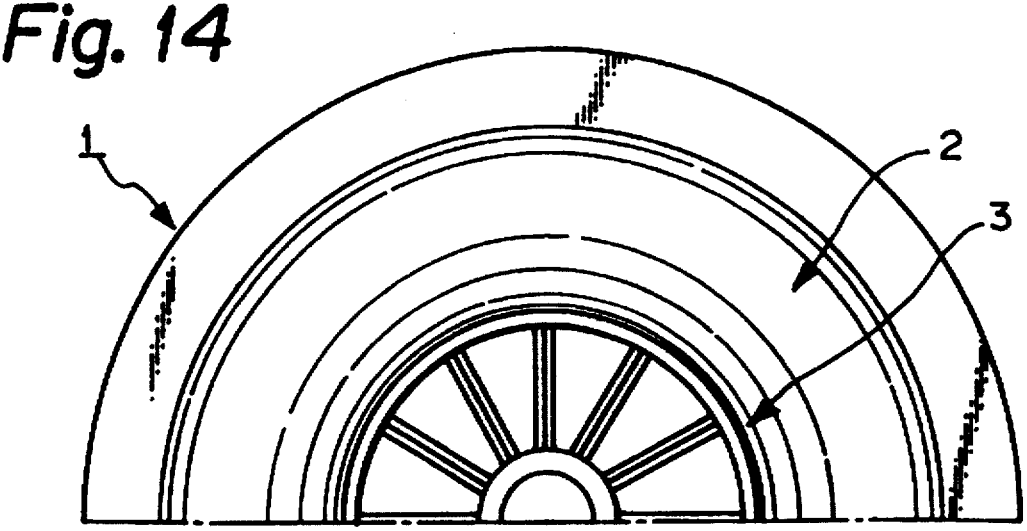
Figure 15:
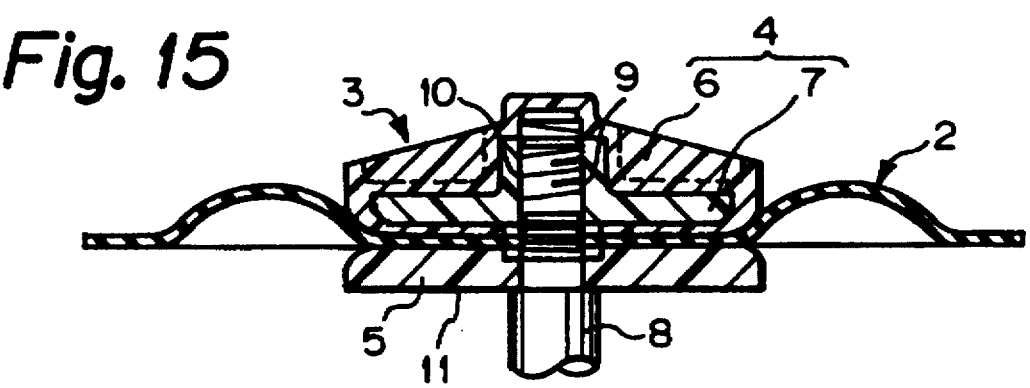
Figure 16:
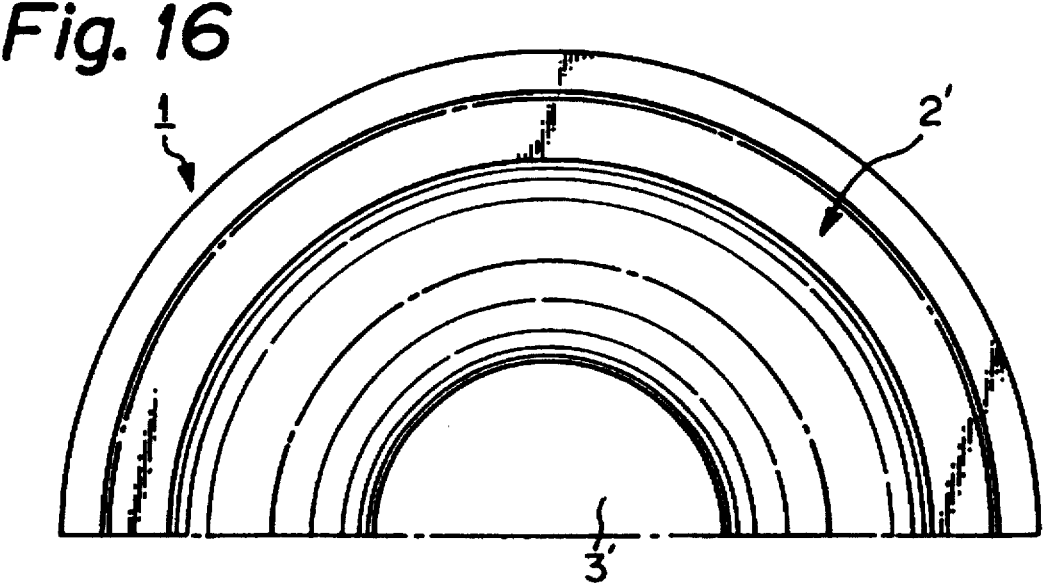

FIGS. 9A–9D illustrate improvements in the center disk member of FIGS. 8A, 8B, in which FIG. 9A is a partially enlarged view of one improvement and shows the center disk member before deformation, FIG. 9B shows the center disk member after deformation, FIG. 9C is a partially enlarged view of another improvement, in which a side opposite an inclined surface has an annular groove, and shows the center disk member before deformation, and FIG. 9D shows the center disk member after deformation;

FIGS. 10A and 10B illustrate another improvement in the first center disk member of FIGS. 8A, 8B, in which FIG. 10A is a partially enlarged view of the improvement and shows the first center disk member before deformation, and FIG. 10B shows the first center disk member after deformation;

FIG. 11, which is a sectional view for describing an example of a method of manufacturing a diaphragm assembly according to the present invention, illustrates a first center disk member, a diaphragm and a reinforcing center disk member set in a mold;

FIGS. 12A–12C are diagrams for describing the charging of injected resin into the mold in which FIG. 12A illustrates the manner in which injected resin fills the mold under high pressure through a resin charging port, FIG. 12B illustrates the manner in which the central portion of the diaphragm is deformed by the high-pressure charging of the injected resin, and FIG. 12C illustrates the manner in which the injected resin completely fills and hardens in a resin charging space;

FIG. 13 is a longitudinal sectional view for describing the formation of threaded portion in which a support rod is fastened;

FIG. 14 is a plan view showing, in part, a diaphragm and center disk which construct a diaphragm assembly according to the prior art;

FIG. 15 is a longitudinal sectional view illustrating the diaphragm assembly of FIG. 14;

FIG. 16, which shows another example of a diaphragm assembly according to the prior art, is a plan view illustrating, in part, the structure of a diaphragm assembly in which a diaphragm and a center disk have a unitary construction; and FIG. 17 is a longitudinal sectional view of the diaphragm assembly illustrated in FIG. 16.

DESCRIPTION OF THE PREFERRED EMBODIMENTS

Preferred embodiments of the present invention will now be described in detail with reference to the accompanying drawings.

Figure 1:
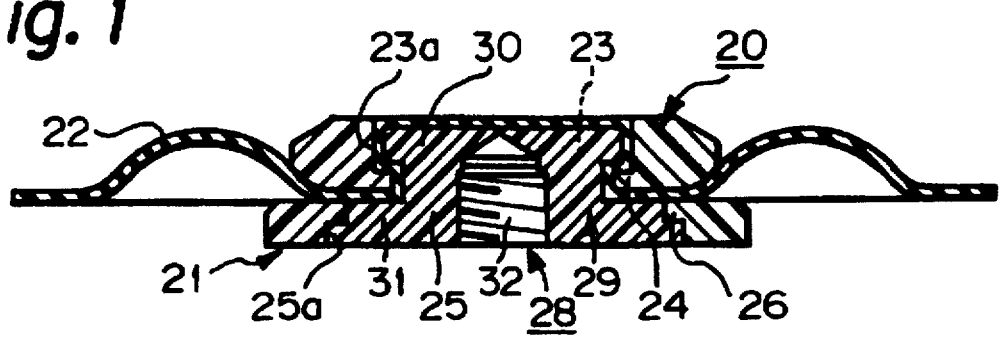
FIG. 1 is a longitudinal sectional view illustrating an embodiment of a diaphragm assembly according to the present invention.
Figure 2:
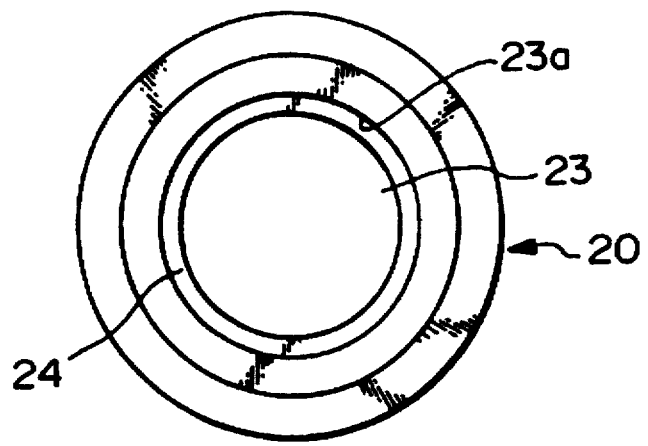
FIG. 2 is a plan view showing a first center disk member illustrated in FIG. 1.
Figure 3:
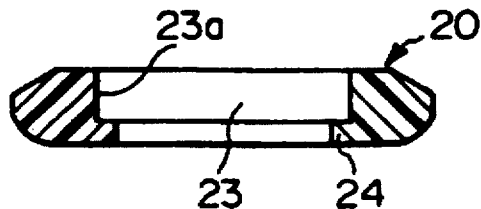
FIG. 3 is a longitudinal sectional view of the first center disk member shown in FIG. 2.

FIGS. 1 through 3 illustrate an embodiment of a diaphragm assembly according to the present invention, in which FIG. 1 is a longitudinal sectional view of the diaphragm assembly. As shown in FIG. 1, the diaphragm assembly according to the invention includes a first center disk member 20 made of resin and constructing a center disk to which a support rod (not shown) made of resin is fastened. A reinforcing center disk member 21 is made of resin and opposes the first center disk member 20 through the intermediary of a resin diaphragm assembly 22. As shown in FIGS. 2 and 3, the first center disk member 20 has a centrally located resin charging space 23 to be filled with resin, described later. The first diaphragm assembly 20 further includes a circular inner peripheral wall 23a delimiting the resin charging space 23, and the inner peripheral wall 23a is formed to include an inwardly directed, circular inner flange 24 on the side facing the reinforcing center disk member 21. The reinforcing center disk member 21 has a centrally located resin charging space 25 to be filled with resin, and a circular inner peripheral wall 25a delimiting the resin charging space 25. The inner peripheral wall 25a is formed to include an inwardly directed, circular inner flange 26 on the side facing the first center disk member 20. Through a manufacturing method described later, the resin charging spaces 23, 25 are filled with a resin-molded body 29 serving as a second center disk member 28, which is situated on the side of the diaphragm 22 opposite the first center disk member 20. The resin-molded body 29 has an outwardly projecting first outer flange 30 residing inside the resin charging space 23 and a second outer flange 31 residing outside the resin charging space 23 and cooperating with the first outer flange 30 to embrace the inner flange 24 from both sides in the thickness direction thereof. The first outer flange 30 residing inside the resin charging space 23 of the first center disk member 20 comprises a flange having a small diameter, and the second outer flange 31 residing outside the resin charging space 23 of the first center disk member 20 comprises a flange having a larger diameter. The diaphragm 22 is disposed along and in intimate contact with the inner peripheral wall 23a delimiting the resin charging space 23, and a portion of the diaphragm 22 is clamped between the inner flange 24 and the first and second outer flanges 30, 31. The resin-molded body 29 is formed to have a threaded portion 32 for fastening a support rod.

Such resin materials as PFA, PTFE and PVC can be used to form the first center disk member 20, and such resin materials as PFA, PTFE, PEEK and PVC can be used to form the reinforcing center disk member 21. Further, such resin materials as PTFE, PFA and HYTREL can be used to form the diaphragm 22, and such resin materials as PFA, PEEK and PVC can be used to form the resin-molded body 29. The diaphragm assembly according to the present invention can be formed by combining these resin materials of identical or different types. The formal names of these resins are stated below. The support rod may also consist of a similar resin material.

The aforementioned resin materials are as follows:

PFA: perfluoroalkoxy fluoroplastic

PTFE: polytetrafluoroethylene

PVC: polyvinyl chloride

PEEK: polyetheretherketone

HYTREL™ (Dupont): thermoplastic elastomer

Figure 4:
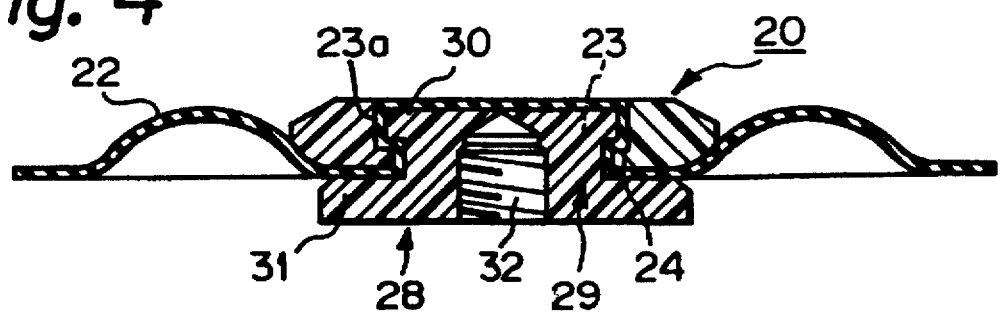
FIG. 4 is a longitudinal sectional view showing another embodiment of a diaphragm assembly according to the present invention.

According to this embodiment, the second center disk member 28 comprises the reinforcing center disk member 21 and the resin-molded body 29. However, as illustrated in FIG. 4, the first center disk member 28 may be formed solely of the resin-molded body 29.

When the diaphragm assembly is employed in a pump device or flow control valve used in supplying an etching solution or the like in a semiconductor manufacturing process, the diaphragm assembly is installed in the pump device or flow control valve in such a manner that the first center disk member 20 is made the side brought into contact with the solution and the second center disk member 28 is made the side that does not come into contact with the solution.

A modification of the diaphragm assembly according to the invention will now be described.

Figure 5A:
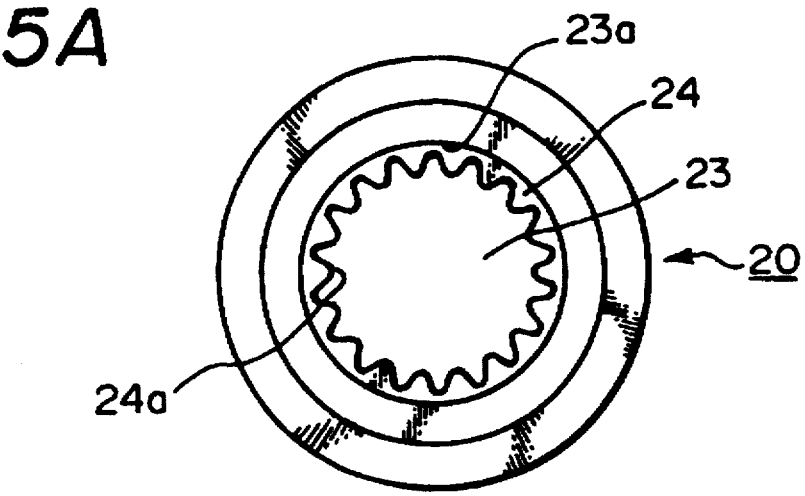
Figure 5B:
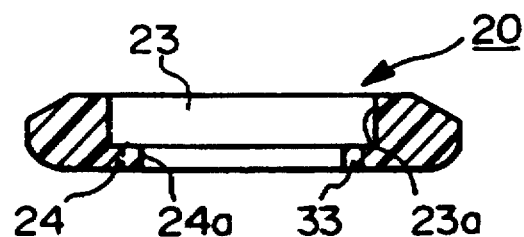

FIGS. 5A and 5B illustrate a first modification of the first center disk member 20 according to the invention. As shown in FIGS. 5A and 5B, the inner peripheral wall 24a of the inner flange 24 is formed to have a sinusoidally shaped serrated portion 33 along the circumferential direction of the inner peripheral wall 23a defining the resin charging space 23. The serrated portion 33 disperses stress, which develops in the direction of rotation, applied to the diaphragm 22 and to the resin-molded body 29 serving as the second center disk member 28.

Figure 6A:
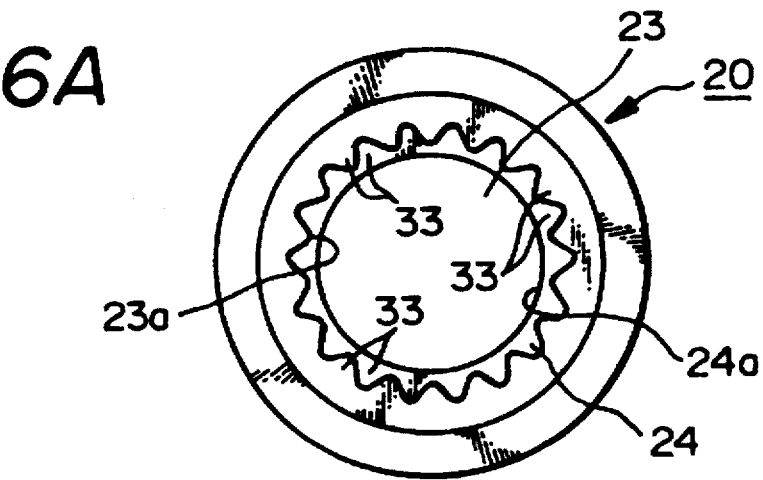
Figure 6B:
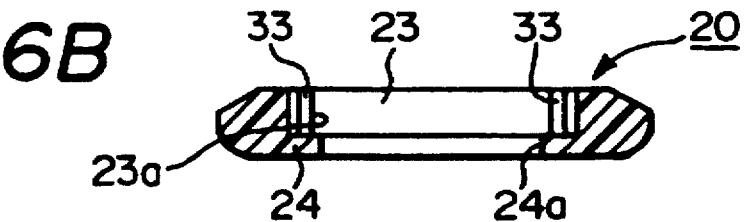

FIGS. 6A and 6B illustrate a second modification of the first center disk member 20 according to the invention. As shown in FIGS. 6A and 6B, the part of the inner peripheral wall 23a at the location where the inner flange 24a is not formed is formed to have the sinusoidally shaped serrated portion 33 along the circumferential direction of the inner peripheral wall 23a. The serrated portion 33 disperses stress, which develops in the direction of rotation, applied to the diaphragm 22 and to the resin-molded body 29 serving as the second center disk member 28.

In accordance with the first and second modifications, the area of surface contact with the resin-molded body 29 can be enlarged and the durability of the diaphragm assembly can be improved without increasing the degree of elongation of the diaphragm 22.

It should be noted that the structure of the second modification and the structure of the first modification may be used in combination.

Figure 7A:
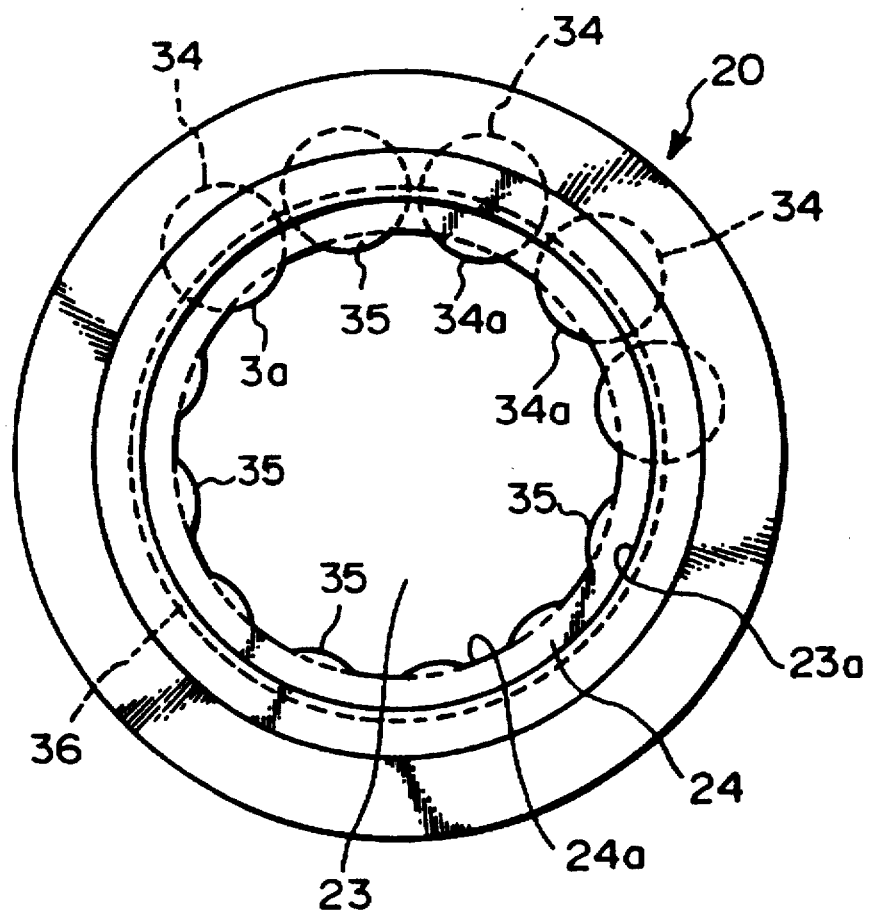
Figure 7B:
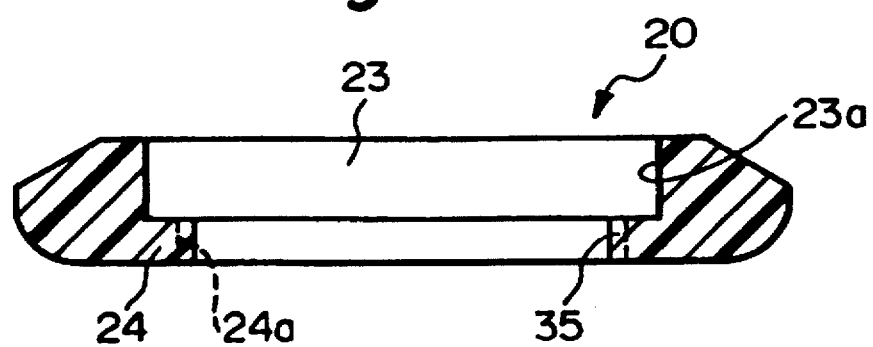

FIGS. 7A and 7B illustrate a third modification of the first center disk member 20 according to the invention. As shown in FIGS. 7A and 7B, the inner peripheral wall 24a of the inner flange 24 is formed to have equiangularly spaced protrusions 35 whose profiles 34a define the circular arcs of imaginary circles 34. The protrusions 35 are formed along the circumferential direction of the inner peripheral wall 23a defining the resin charging space 23 and disperse stress, which develops in the direction of rotation, applied to the diaphragm 22 and to the resin-molded body 29 serving as the second center disk member 28. Numeral 36 denotes the locus described by the centers of the imaginary circles 34.

FIGS. 8A and 8B are basic diagrams for describing a more useful improvement in the first center disk member 20 of the present invention. If one end face 24b of the flange 24 in the thickness direction thereof as shown in FIGS. 8A, 8B is perpendicular to the direction (indicated by the arrows A in FIG. 8B) in which the diaphragm 28 is capable of moving, the inner flange 24 is likely to slip when it is deformed in such a direction that allows the resin-molded body 29 to become dislodged.

FIG. 9A is a partially enlarged view of a modification illustrating an improvement in which the aforementioned dislodgment of the resin-molded body 29 is prevented. This dislodgment of the resin-molded body 29 might otherwise occur when the inner flange 24 is deformed, by movement of the diaphragm 22, in a direction which allows the resin-molded body 29 to slip out. As shown in FIG. 9A, one end face 24b of the inner flange 24 in the thickness direction thereof, which end face is on the side near the small-diameter flange 30, is formed as an inclined surface. When the inner flange 24 is deformed in such a direction that the resin-molded body 29 may become dislodged, the inclined surface applies an opposing force to prevent this from occurring. In accordance with the first center disk member 20 having the structure illustrated in FIG. 9A, the angle defined by the inner peripheral wall 23a and end face 24b is an acute angle, as illustrated in FIG. 9B, even when the inner flange 24 is deformed in a direction that ordinarily would allow the resin-molded body 29 to become dislodged. As a result, the resin-molded body 29 is reliably prevented from slipping out of the first center disk member 20. As shown in FIGS. 9C and 9D, the surface of the first center disk member 20 on the side opposite the inclined surface is formed to include an annular continuous or intermittent groove 25c. The groove 25c allows the first center disk member 20 to flex diametrically outwardly so that the force that attempts to dislodge the resin-molded body 29 can be greatly reduced.

FIG. 10A is a partially enlarged view of another modification illustrating an improvement in which the aforementioned dislodgment of the resin-molded body 29 is prevented. This lodgement of the resin-molded body 29 might otherwise occur when the inner flange 24 is deformed, by movement of the diaphragm 22, in a direction which allows the resin-molded body 29 to slip out of the first center disk member 20. In order to apply a resisting force in a direction to prevent the dislodgment of the resin-molded body 29 when the inner flange 24 is deformed in such a direction, the inner peripheral wall 32a delimiting the resin charging space 23a of the first center disk member 20 is formed to have a circumferentially extending inclined rib 37 spaced away from the inner flange 24 in the thickness direction thereof. In accordance with the first center disk member 20 having the structure illustrated in FIG. 10A, the angle defined by the inner peripheral wall 23a and the inclined rib 37 is an acute angle, as illustrated in FIG. 10B, even when the inner flange 24 is deformed in a direction that ordinarily would allow the resin-molded body 29 to become dislodged. As a result, the resin-molded body 29 is reliably prevented from slipping out of the first center disk member 20. In addition, dislodgment of the resin-molded body 29 is prevented in redundant fashion by the inclined rib 37 and the inner flange 24. As a result, the resin-molded body 29 can be prevented from slipping out of the first center disk member 20 even more reliably.

FIGS. 11 and 12 are diagrams for describing an example of a method of manufacturing a diaphragm assembly according to the present invention. The description below is given with regard the diaphragm assembly having the structure illustrated in FIG. 1.

As shown in FIGS. 11 and 12, numeral 38 denotes a split mold serving as a fixed mold, and number 39 denotes a split mold serving as a movable mold. The split mold 38 has a cavity 40. The cavity 40 has a shape generally corresponding to the reinforcing center disk member 21, the split mold 38 is provided with an injection port 41 for high-pressure resin, and with a sprue 42. The reinforcing center disk member 21 is set in the cavity 40 in advance in such a manner that its resin charging space 25 faces the sprue 42. The split mold 39 has cavities 43 and 44. The cavity 43 has a shape generally corresponding to the first center disk member 20, and the cavity 44 has a shape corresponding to the thin, plate-shaped diaphragm 22. The first center disk member 20 is set in the cavity 43 in advance in such a manner that its resin charging space 23 opposes the resin charging space 25. The diaphragm 22 is set in the cavity 44 in such a manner that the central portion 22a of the diaphragm is situated between the resin charging space 23 and the resin charging space 25.

As shown in FIG. 12A, the split mold 39 is brought into contact with the split mold 38 and an injection resin 45 is introduced through the charging portion 41 and sprue 42. The injection resin 45 is charged into the resin charging space 25 by being forced out of a molding machine at a high pressure and at a prescribed fluidizing temperature. As shown in FIG. 12B, the central portion 22a of the diaphragm 22 is deformed toward the resin charging space 23 by the heat and molding pressure possessed by the injection resin 45. As the injection resin 45 is introduced, the central portion 22a of the diaphragm 22 is brought into intimate contact with the inner peripheral wall 23a of the first center disk member 20. After the resin charging spaces 23 and 25 have been filled with the injection resin 45, the latter hardens with the elapse of a prescribed period of time. As shown in FIG. 12C, the hardening of the injection resin 45 forms the resin-molded body 29 serving as the second center disk member 28 which has the outwardly projecting first outer flange 30 residing inside the resin charging space 23 and the second outer flange 31 residing outside the resin charging space 23 and cooperating with the first outer flange 30 to embrace the inner flange 24 from both sides in the thickness direction thereof. Thus is manufactured a diaphragm assembly consisting solely of a resin material in which the diaphragm 22 is clamped, from both sides in the thickness direction thereof, between the first and second outer flanges 30, 31 and the inner flange 24.

In accordance with this method of manufacture, the first center disk member 20, the diaphragm 22 and the reinforcing center disk member 21 are integrated with the resin-molded body 29 serving as the second center disk member 28, thereby making it possible to manufacture a diaphragm assembly consisting solely of resin material. However, in a case where the diaphragm assembly having the structure shown in FIG. 4 is manufactured, it will suffice merely to change the cavity 40 of the split mold 38 to the corresponding shape.

With the method of manufacture described above, the central portion of the diaphragm is deformed by the resin introduced under high pressure, thereby forming the resin charging space and the injection-molded body of the center disk. However, it is also possible to manufacture the above-mentioned diaphragm assembly through a method of manufacture which includes fitting a center disk member into a previously molded diaphragm of the kind shown in FIG. 12C and then setting them in a mold, charging a resin into a resin charging space under atmospheric pressure and allowing the resin to harden to integrate the previously molded diaphragm and the center disk member. Alternatively, the previously molded diaphragm may be fabricated by blow-molding the diaphragm using high-pressure air rather than by charging the resin in FIGS. 12A–12C. The resin may then be charged under atmospheric pressure in the manner described above to manufacture the diaphragm assembly.

It should be noted that the threaded portion 32 to which the support rod is fastened is formed by applying cutting work after the resin-molded body constituting the diaphragm assembly is extracted from the split molds 38, 39, as shown in FIG. 13.

By virtue of the construction described above, an advantage of the diaphragm assembly according to the present invention is that the center disk to which the support rod is fastened need not be provided with a member made of metal. In addition, the diaphragm assembly can be fabricated without forming the diaphragm to have a through-hole through which the support rod is passed.

In accordance with the method of manufacturing the diaphragm assembly according to the present invention, it is easy and inexpensive to fabricate a diaphragm assembly in which a center disk to which a support rod is fastened does not require a metal member. It is also possible to reduce the weight of the diaphragm assembly.

As many apparently widely different embodiments of the present invention can be made without departing from the split and scope thereof, it is to be understood that the invention is not limited to the specific embodiments thereof except as defined in the appended claims.

What is claimed is:

1. A diaphragm assembly comprising a center disk and a diaphragm made of resin;

said center disk comprising first and second center disk members, made of resin, embracing said diaphragm interposed between them;

said first center disk member having an inner peripheral wall defining a resin charging space and an inwardly directed inner flange provided on said inner peripheral wall;

said second center disk member comprising a resin-molded body formed by charging a resin into said resin charging space and having an outwardly directed outer flange;

a portion of said diaphragm being clamped between said inner flange and said outer flange.

2. The diaphragm assembly according to claim 1, wherein said resin-molded body is formed to have a threaded portion for fastening a support rod.

3. The diaphragm assembly according to claim 1, wherein said first center disk member is a center disk member on a side of liquid contact, and said second center disk member is a center disk member on a side of liquid non-contact.

* * * * *

UNITED STATES PATENT AND TRADEMARK OFFICE
CERTIFICATE OF CORRECTION

PATENT NO. : 5,743,169
DATED : April 28, 1998
INVENTOR(S) : Kazumasa Yamada

It is certified that error appears in the above-indentified patent and that said Letters Patent is hereby corrected as shown below:

Please insert claims 4-8 as follows:

4. The diaphragm assembly according to claim 1, wherein said second center disk member has a reinforcing center disk member made of resin.

5. The diaphragm assembly according to claim 1 wherein the inner peripheral wall of said first center disk member is provided with a serrated surface.

6. The diaphragm assembly according to claim 1 wherein the inner flange of said first center disk member has an inclined surface for preventing dislodgement of said resin-molded body.

UNITED STATES PATENT AND TRADEMARK OFFICE
CERTIFICATE OF CORRECTION

PATENT NO. : 5,743,169
DATED : April 28, 1998
INVENTOR(S) : Kazumasa Yamada

It is certified that error appears in the above-identified patent and that said Letters Patent is hereby corrected as shown below:

7. The diaphragm assembly according to claim 1 wherein the inner peripheral wall of said first center disk member is formed to have a circumferentially extending inclined rib which prevents dislodgement of said resin-molded body.

Signed and Sealed this

Twelfth Day of January, 1999

Attest:

Attesting Officer

*Acting Commissioner of Patents and Trademarks*